United States Patent [19]

Hermann et al.

[11] Patent Number: 5,914,086
[45] Date of Patent: Jun. 22, 1999

[54] METHOD OF MANUFACTURING STRUCTURED MOULDINGS

[75] Inventors: Wilhelm Hermann, Roetgen; Hans Jungk, Aachen, both of Germany

[73] Assignee: U.S. Philips Corporation, New York, N.Y.

[21] Appl. No.: 08/754,340

[22] Filed: Nov. 22, 1996

[30] Foreign Application Priority Data

Nov. 25, 1995 [DE] Germany .......................... 195 43 985

[51] Int. Cl.$^6$ ...................................................... B28B 1/20
[52] U.S. Cl. .................. 264/430; 264/636; 264/637; 264/650; 264/651; 264/655; 264/660
[58] Field of Search ................................. 264/430, 636, 264/637, 650, 651, 603, 655, 660

[56] References Cited

U.S. PATENT DOCUMENTS

| | | | |
|---|---|---|---|
| 2,914,834 | 12/1959 | Daniel | 264/637 |
| 2,962,790 | 12/1960 | Daniel | 264/637 |
| 2,988,456 | 6/1961 | Fairbanks et al. | 264/651 |
| 3,689,614 | 9/1972 | Bortz et al. | 264/636 |
| 5,419,860 | 5/1995 | Menchhofer | 264/636 |

FOREIGN PATENT DOCUMENTS

| | | |
|---|---|---|
| 3702025A1 | 8/1988 | Germany . |
| A02083226 | 3/1990 | Japan . |
| A04240134 | 8/1992 | Japan . |

*Primary Examiner*—Christopher A. Fiorilla
*Attorney, Agent, or Firm*—Norman N. Spain

[57] ABSTRACT

A method of manufacturing a flat, glass-like or ceramic moulding having a structured surface, in which a rotationally symmetrical, moist green body is manufactured from a suspension of a highly dispersed, powdered solid material and a dispersing agent by centrifuging in a hollow mould, whereafter said green body is removed from the hollow mould and, if necessary, rolled out subsequently, cut up and, after which it is spread out on a structure-imparting substrate, the surface is embossed by applying pressure and, subsequently, the glass-like or ceramic moulding is produced by drying and sintering.

16 Claims, No Drawings

METHOD OF MANUFACTURING STRUCTURED MOULDINGS

BACKGROUND OF THE INVENTION

The invention relates to a method of manufacturing a flat, glass-like or ceramic moulding having a structured surface.

It is known that glass-like or ceramic mouldings can be manufactured from a suspension of a finely dispersed, powder-ceramic material. In the known process, first a moist, still shapable green body is manufactured which is not ready for use until after the subsequent drying and sintering processes. This method has the advantage that shaping takes place at room temperature. The solids content in the pre-densified green body should be as high as possible to minimize shrinkage during drying and sintering.

In German Offeniegungsschrift 37 02 025, a description is given of the manufacture of rotationally symmetrical, porous solid bodies having a high relative density from a diluted suspension which contains $SiO_2$ particles as the powder-ceramic material, in which process centrifugal forces are used to successively deposit thin films of solid particles by centrifuging in a hollow mould. The mouldings thus formed have a tubular geometry.

It has also been proposed to further densify the green bodies manufactured by the above rotation process by subjecting said green bodies to an ultrasonic liquefaction process and to yet another centrifuging process. This enables a second, much more densified, moist green body to be manufactured, whose solids content can be further increased by repeating the above-mentioned post-densification steps.

Many applications require, however, flat, glass-like or ceramic mouldings which are provided with a structure which is adapted to the intended application. If, for example, a quartz-glass disc having a specific surface profile or apertures is required, special etch or drill processes must be carried out by means of the appropriate, expensive equipment. Such flat glasses are necessary, for example, for flat display screens, printing heads (Bubble Jet, Ink Jet), optical filters which can withstand high thermal loads, as well as microlenses.

OBJECTS AND SUMMARY OF THE INVENTION

Therefore, it is an object of the invention to provide a method of manufacturing large-sized, homogeneous, highly pure, structured, flat mouldings, in particular for the manufacture of quartz-glass discs for display screens.

This object is achieved by a method of manufacturing a flat, glass-like or ceramic moulding having a structured surface, in which a rotationally symmetrical, moist green body is manufactured from a suspension of a highly dispersed, powdered solid material and a dispersing agent by centrifuging in a hollow mould, whereafter said green body is removed from the hollow mould and, subsequently, cut up and spread out on a structure imparting substrate, after which the surface is embossed by applying pressure and, subsequently, the glass-like or ceramic moulding is produced by drying and sintering.

Dependent upon the intended application, nano amorphous and/or nanocrystalline, mono-component or multi-component, single-phase or multi-phase materials are used as the highly dispersed, powdered solid material. This solid material may consist of only one component, for example $SiO_2$ or $Al_2O_3$, or, it may comprise a plurality of components. Said solid material may be used as a multi-phase mixture of $Al_2O_3$ and $SiO_2$, or it may be used as a single-phase solid solution of $Al_2O_3$ in $SiO_2$ or of $SiO_2$ in $Al_2O_3$.

For the manufacture of mouldings from quartz glass (silicic acid glass) use can be made of commercially available powders of pyrogenic silicic acid. In the manufacture of mixed-silicate glasses, for example borosilicate glasses, it is recommended to use a mixed oxide, which comprises a solid solution Of $B_2O_3$ in $SiO_2$ as the starting material instead of the isolated, juxtaposed oxides of boron and silicon because of the high reactivity of $B_2O_3$ with water. For the above material compositions, methods are known which enable sub-microscopic particles, preferably nano-scale particles, to be manufactured. Methods which are customarily used include flame hydrolysis, laser pyrolysis, plasma-activated CVD (chemical vapor deposition) processes, laser ablation and spray pyrolysis.

The highly dispersed, powdered solid material should have a particle size below 1 $\mu$m, preferably below 50 nm, and an average particle diameter of approximately 40 nn in combination with a specific surface of 40–60 $m^2/g$. Apart from the fineness of the materials used, also the type of dispersing agent is very important to successfully carry out the method in accordance with the invention. If pyrogenic silicic acid is used as the starting material, then pure distilled water is an excellent dispersing agent. The firmness of the green body can be increased in the drying phase by adding binders such as polyvinyl alcohol (®Moviol). Softeners, such as glycerol or triethylene glycol, can be added to the suspension to increase the shapability of the moist green body. However, these additives must be removed from the green body after the drying process, for example, by heating in a furnace in a stream of oxygen. After the breakdown of the binder, it is recommended to carry out a purification step in a chlorine-containing atmosphere, in which impurities at the surface, but also within the volume of the green body, are removed prior to sintering.

In the method in accordance with the invention, a suspension is used having a weight ratio of the solid material to the dispersing agent in the range from 1:50 to 1:5, which suspension is used to manufacture a first moist green body having a solids content of approximately 30 to 38 vol. % by centrifuging. In accordance with the method described in German Offenlegungsschrift 37 02 025, thin solid films are successively deposited in a hollow mould by a continuous, transferring centrifuging process and the excess residual suspension is removed from the hollow mould in such a manner that a thin film of said residual suspension always remains on the deposited solid material.

Prior to compacting by drying and sintering, the moist green body thus manufactured will be subject to linear shrinkage by maximally 30%. This may lead to the formation of undesirable cracks. This shrinkage, which occurs in the mould and is brought about by an as yet incomplete or non-continuous solid skeleton, is particularly critical in the case of green bodies having a complex structure because crack-formation takes place when the green-body material adheres to the mould and/or unavoidably shrinks onto the mould during the course of the drying process.

Therefore, it proved to be advantageous to subject the first, still wet green body to ultrasonic liquefaction and to a further centrifuging process to form a higher-density green body from which, after subjecting it once again to ultrasonic liquefaction and centrifuging, green bodies having a solids content up to 50 vol. % can be formed step-wise. In this manner, a high post-densification can be attained, which substantially suppresses drying shrinkage and enables crack-free moulded bodies to be formed.

Advantageously, it should be possible to divide the hollow mould used to form the tubular green body into two or more parts, so that the green body can be easily removed from said mould. It is advantageous to manufacture the constituent parts of the hollow mould from a suitable synthetic resin material.

To manufacture a flat, glass-like or ceramic moulding having a structured surface, the green body is removed from the hollow mould and cut up along a surface line, whereafter it is made flat between polyethylene foils. The application of roll pressure enables the thickness of the green slab to be gradually reduced until the desired thickness is attained. Subsequently, the green slab, both surfaces of which are initially still smooth, are spread out on a shape-imparting substrate and the desired surface structure, including any necessary apertures, are formed by rolling, embossing, pressing or punching. The moist green slab can alternatively be provided between an upper and a lower shape-imparting surface to which a pressure is applied so that the surface of said slab is structured on both sides. It is alternatively possible to define the surface structure of the green body by the shape-imparting inner surface of the hollow mould in which said green body is formed. If, as a result of a memory effect, the lay-flat green body tends to return to the cylindrical geometry of the hollow mould, this can be effectively counteracted by a combination of heat (microwave heating) and ultrasound.

After the green body has been shaped, it is dried at room temperature, for example, on a stretched nylon fabric, for a few hours in air. Subsequently, sintering of the green body to form quartz glass is carried out isothermally in vacuum or in a helium atmosphere at temperatures in the range between 1300 and 1500° C. The quartz-glass slabs thus manufactured are free from bubbles and from scattering centers, and sharp-edged details are free from roundings.

The method in accordance with the invention offers many possibilities of adding a suitable dopant to the quartz glass in order to modify the quartz-glass properties. This doping does not have to be homogeneous across the thickness of the slab, it may also exhibit a gradient or be different for each layer since individual layers are deposited in the centrifuge. The doping operation may consist in adding a fine metal-oxide powder or a mixture of a plurality of metal oxides to the suspension. In an alternative doping method, the green body is saturated with the solution of a metal propylate or metal hydrolyzate prior to the sintering process.

The flat, glass-like mouldings having a structured surface, which are manufactured in accordance with the inventive method, are used for printing heads (Bubble Jet, Ink Jet), flat display screens, optical filters which can withstand high thermal loads, and for microlenses.

EXAMPLE

A suspension was prepared by dispersing 200 g of a finely dispersed pyrogenic silicic acid from the Degussa company (tradename ®Aerosil OX50) with a specific surface of 50 $m^2/g$ in 1800 g water, while stirring for one hour and cooling to 20° C. in an ultrasonic bath. This suspension was added to an aqueous polyvinyl acetate solution containing 5 g polyvinyl acetate per 100 ml. The pH-value of the mixture was adjusted to approximately 7 by adding triethanolamine, and the solution was dispersed for another hour. Subsequently, 5% of glycerol, with respect to the Aerosil OX50 content, were added. To isolate relatively coarse constituents, this mixture was subjected to a pre-centrifuging process at 20,000 U/min. at a flow rate of 4 ml/s. To manufacture a tubular green body, the suspension thus obtained was then introduced into a steel rotor by a transferring centrifuging process at 30,000 U/min. The steel rotor contained a hollow mould which could be divided into two parts, a synthetic resin-coated aluminum foil being provided in said hollow mould. The deposition side of the foil was treated with silicone grease so that the deposit could be easily detached from the foil. After the actual deposition process, the deposit was subjected to a densification process for two minutes at 30,000 U/min.

After completing the deposition process, the hollow mould was removed from the steel rotor, whereafter the hollow mould was opened and the green body including the foil was removed from the mould. The tubular green body was cut up along a surface line and made flat between polyethylene foils.

To produce a slab of 85×170 mm, the green body was rolled between said polyethylene foils until the desired thickness was achieved. The slab thus formed was structured by pressing it onto a moulded body, the polyethylene foil being previously removed from the surface of the green body to be structured.

The green slab which is faithfully structured down to the last detail was then dried in air at room temperature on a stretched nylon fabric in several hours. Subsequently, the binder was removed in two steps by means of a standard process: first, the green slab was heated to 500° C. for ten hours in a nitrogen flow of 0.5 l/min and, subsequently, to 550° C. for two hours in an oxygen flow of 0.5 l/min.

Subsequently, OH groups and compounds of the sub-group elements were removed by means of a standard purification process in which, first, a mixture of oxygen and thionyl chloride in a quantity of 0.5 l/min and a temperature of 400° C. were employed for two hours. In this process, ten minutes at standard pressure alternates continuously with one minute at only 20–100 mbar, which is obtained by evacuation. After the first two hours, the process was continued for another two hours at 1100° C.

Subsequently, an isothermal sintering process was carried out in a vacuum-sinter device at 1500° C.

We claim:

1. A method of manufacturing flat, glass or ceramic mouldings having structured surfaces, comprising manufacturing a rotationally symmetrical, moist green body from a suspension of a highly dispersed, powdered solid glass-forming or ceramic material and a dispersing agent by centrifuging said suspension in a hollow mould, removing the resultant green body from the mould, cutting up said green body and, if necessary, rolling out the resultant cut up parts of said moist green body, spreading said cut up parts on a structure-imparting substrate, providing pressure to said sarts, spread out on said substrate to thereby emboss a surface of said cut up parts and then drying and sintering said cut up parts to form sintered moulded glass or ceramic bodies.

2. A method as claimed in claim 1, characterized in that a ceramic solid material is used which comprises only one component.

3. A method as claimed in claim 1, characterized in that for the ceramic solid material use is made of $SiO_2$ or $Al_2O_3$.

4. A method as claimed in claim 1, characterized in that a ceramic solid material is used which comprises a plurality of components.

5. A method as claimed in claim 4, characterized in that a multi-phase mixture of $Al_2O_3$ and $SiO_2$ is used as the ceramic solid material.

6. A method as claimed in claim 4, characterized in that a single-phase solution of $Al_2O_3$ in $SiO_2$ or of $SiO_2$ in $Al_2O_3$ is used as the ceramic solid material.

7. A method as claimed in claim 1, characterized in that the ceramic solid material in the suspension is a highly dispersed material having a particle size below 1 μm, preferably below 50 nm, and an average particle diameter of approximately 40 nm.

8. A method as claimed in claim 1, characterized in that distilled water is used as the dispersing agent.

9. A method as claimed in claim 1, characterized in that the moist green body formed in the hollow mould by centrifuging is post-densified by ultrasonic liquefaction and renewed centrifuging.

10. A method as claimed in claim 9, characterized in that post-densification of the moist green body by ultrasonic liquefaction and centrifuging is carried out a number of times in a row.

11. A method as claimed in claim 1, characterized in that the hollow mould is divisible into two or more parts.

12. A method as claimed in claim 1, characterized in that said surface of the cut up parts is structured on a shape-imparting substrate by rolling or pressing.

13. A method as claimed in claim 12, characterized in that said cut up parts are arranged between an upper and a lower shape-imparting substrate, whereafter both surfaces of said cut up parts are structured by applying pressure.

14. A method as claimed in claim 1, characterized in that a structure is already imparted to the surface of the green body by a shape-imparting inner surface of the hollow mould.

15. A method as claimed in claim 1, characterized in that a dopant is added to the suspension.

16. A method as claimed in claim 1, characterized in that prior to drying and/or sintering cut up parts spread out on the structure-imparting substrate are provided with a dopant.

* * * * *